Aug. 14, 1951  J. H. CHADBOURNE  2,564,424
PICKER CONSTRUCTION
Filed April 16, 1945
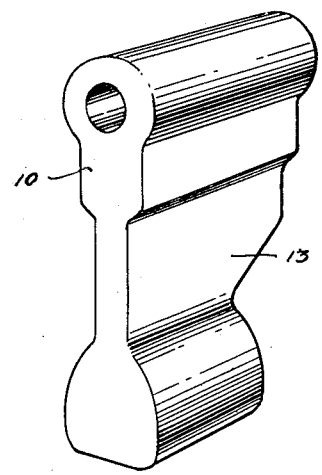
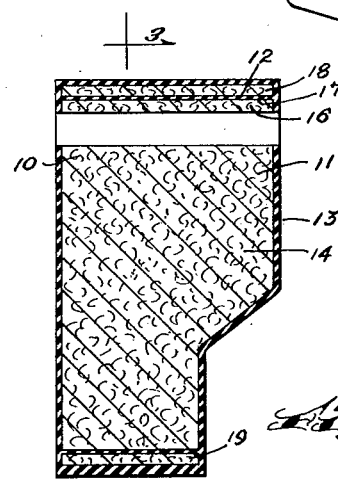
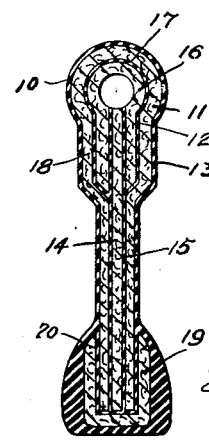
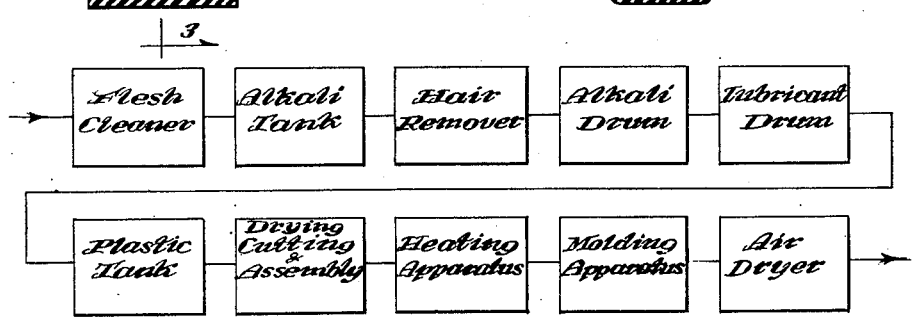
INVENTOR.
Joseph H. Chadbourne
BY Nathaniel Frucht
Attorney Patented Aug. 14, 1951

2,564,424

UNITED STATES PATENT OFFICE 2,564,424

PICKER CONSTRUCTION

Joseph H. Chadbourne, Danielson, Conn., assignor to The Danielson Manufacturing Company, a corporation of Connecticut Application April 16, 1945, Serial No. 588,656

2 Claims. (Cl. 139—160)

1

The present invention relates to the manufacture of laminated articles, and has particular reference to the construction of machine elements made of rawhide.

The principal object of the invention is to provide a one-piece rawhide machine element having a greatly increased life.

A further object of the invention is to provide a rawhide machine element which is self-lubricating.

An additional object of the invention is to provide a construction for a rawhide element which permits the element to be kept in storage without being effected by atmospheric conditions, heat and moisture, this feature being particularly valuable for rawhide elements which are used in textile machinery.

With the above and other objects and advantageous features in view, the invention consists of a novel method of manufacture and a novel article of manufacture resulting therefrom, more fully described in the detailed description following in conjunction with the accompanying drawings, and more specifically defined in the claims appended thereto.

In the drawings:

Fig. 1 is a perspective view of a rawhide picker embodying the invention;

Fig. 2 is a central longitudinal section thereof;

Fig. 3 is a transverse section on the line 3—3 of Fig. 2; and

Fig. 4 is a diagrammatic layout of the manufacturing steps.

It has been found desirable to improve the construction of laminated machine elements, such as for example rawhide pickers for a textile loom, in order to obtain longer life and more effective operation. To this end, I have devised a novel manufacture whereby the rawhide is first impregnated with a lubricant so that the lubricant is suspended between the interstices of the hide fibres; the article is then built up from laminations of impregnated rawhide, with intermediate sheets of thermo-plastic material, and is then uniformly heated and molded to shape under proper heat and pressure conditions so that an integral one-piece article results, made up of laminations of lubricant impregnated rawhide bonded together by thermo-plastic material, and if desired, completely sheathed within a thermoplastic covering.

2

Referring to the drawings, which illustratively disclose a loom picker made in accordance with the invention, the picker 10 comprises rawhide laminations 11 which are thoroughly impregnated with a suitable lubricant, the laminations being bonded together by intermediate layers 12 of thermo-plastic material, and having an outer covering or sheath 13 of thermo-plastic material.

The impregnation of the rawhide with a suitable lubricant is accomplished as follows. The hides as received at the hide curing plant contain hair and foreign matter; they are completely washed and are then run through a cleaning machine of standard type which removes the flesh and the foreign matter on the flesh side of the hide. The hides are then placed in a tank containing a very strong solution of chemical lime, which loosens up the hair so that it may be readily removed, and at the same time neutralizes the amino acids present in the hides. Great caution is exercised to retain the hides and all solutions which come in contact with the hides on the alkaline side, and the hides are not allowed to come in contact with any acid solution. Thus, certain hides may require the use of sodium sulfide to loosen the hair; in such case, additional amounts of chemical lime are added to maintain the hides in an alkaline condition.

The hides normally remain in the chemical lime tank for an extended period, usually seven days, and are then removed from the tanks, and the hair is then removed by means of standard type dehairing machines. The hides are then placed in a revolving drum provided with a hollow gudgeon, through which an alkaline solution of chemical lime is injected while the hides are thoroughly agitated, so that they are completely impregnated with the alkaline solution. This additional impregnation provides complete neutralization of the amino and fatty acids in the hides, which are repellant to thermoplastic material and would interfere with subsequent steps in the manufacture.

After alkalination the alkaline solution is withdrawn from the drum, and sulphonated completely neutral sperm oil, which does not saponify with the retained alkaline, is injected through the gudgeon of the drum in the proportion of approximately 2% by weight of the full hide mass in the drum. This neutral sulphonated sperm oil is extremely penetrating, and agitation of the hides in the drum causes the oil to be completely and uniformly absorbed by the hides, with the result that the lubricant is mechanically suspended and locked within the interstices of the hide fibres.

The impregnated hides are now removed from the drum and are dried in air-conditioned drying compartments. The dried hide, thoroughly impregnated with sulphonated sperm oil and completely alkalized, is then impregnated with a suitable synthetic thermo-plastic material, such as phenol formaldehyde resin, although other plastic materials such as nylon and urea compounds are also suitable. The flexibility and the toughness of the resulting product is controlled by regulating the amount of plasticizer in the thermoplastic material, the percentage varying from 5% to 50%, depending on the degree of flexibility and toughness desired. The plasticizer also serves to increase the strength of the resulting molded laminated product when subjected to extreme degrees of heat and cold. A suitable plasticizer is tri-ethylene glycol di 2 ethyl butyrate.

After the hide has thus been impregnated with thermo-plastic material having the desired percentage of plasticizer, it is cut, broached or die cut to a pre-determined size and shape. For certain rawhide articles it may be preferred to cut the impregnated hide to size first, and then to impregnate the cut pieces with the thermo-plastic material and plasticizer. The cut impregnated hide blanks may now be used to build up a laminated machine element of the desired size and shape.

When manufacturing a laminated picker such as shown in Fig. 1, a center rawhide blank 14 is provided with surrounding layers 15 of thermoplastic material in sheet form; a second lamination 16 is bent in a round core around the upper end of lamination 14, as illustrated, to provide a spindle hole for the picker. An additional sheet 17 of thermo-plastic material is then positioned around the two laminations and a third lamination 18 is then mounted around the other laminations as illustrated. A cap 19 of U-shaped rawhide is then mounted over the impact end of the picker, with a sheet of thermo-plastic material 20 between. The entire assembly is now wrapped around with additional sheets of thermoplastic material, and is subjected to regulated heat and pressure and molded into an integral one-piece laminated picker.

The molding of laminated rawhide products with thermo-plastic material has heretofore been difficult, as the extreme heat required to obtain the proper temperature for the mass in the interior of the article was so great that the animal fibres on the outside surface would become charred and burned before the animal fibres in the interior could reach the required temperature. I have found that the animal fibres of rawhide which has been prepared as above described will stand a temperature in excess of 300 degrees Fahrenheit without injury to the tensile strength, resiliency, pliability and other inherent qualities of the rawhide.

It is preferred to use a heating process which will uniformly raise the temperature throughout the assembled article blank. Although a conveyor type furnace may be used, in which the articles are inserted in a cold state and are then gradually and progressively passed through a heating furnace so as to obtain a gradual rise in temperature, or the articles may be heated in a chemical bath which is non-reactive and neutral to the impregnated laminations and to the thermo-plastic material, it is preferred to use dielectric heating. The assembled article blank is placed between two electro-static plates and the resulting electronic field raises the temperature of the thermo-plastic material and the rawhide uniformly throughout the article blank so that the desired temperature rise is effected simultaneously throughout the entire mass, thus preventing any charring or injury.

The body blank having been uniformly softened by bringing to the correct temperature, the preferred temperature being from 220 to 290 degrees Fahrenheit, is then immediately transferred to a compression mold of proper shape, which is preferably initially heated so as to maintain the temperature already imparted to the article blank. The most suitable type of compression mold is a standard split mold operated mechanically or hydraulically; the pressure within the mold depends on the desired cure of the article, and may run from as low as 400 lbs. per square inch up to 3 or 4 thousand lbs. per square inch.

The applied pressure causes further impregnation of the rawhide with thermo-plastic material which varies somewhat directly with the amount of pressure applied, and a permanent plastic bond between the rawhide laminations results. The mold is then opened and the molded article removed and air-dried. The thermo-plastic material flashes resulting from the molding operation are then broken or buffed off, and the one-piece laminated article is ready for use.

The finished rawhide article is thus completely enveloped in a shroud or sheath of thermoplastic material, is not affected by heat, moisture, acids, oils and other foreign materials, is completely insulated, and is a non-conductor of electricity. It is uniform in shape, has no rivets or other holding devices and its surfaces are completely smooth so that it will not catch filling, threads, or bind when in use. An advantage to the user is ease of operation. The core of the picker contains rawhide, which is the best material for resisting repeated shock and has a high tensile strength running to 18 thousand lbs. per square inch on a ⅛ inch cross section.

In actual use when the picker is about to be worn out, the tough rawhide in the core shows preliminary evidence of breaking in sufficient time so that the loom operator will evidently remove the picker without causing damage to the fabric being woven. Since the picker is a machine element which is subjected to a reciprocating motion running as high as 250 times per minute, lubrication is required. Although the rawhide is initially sheathed with plastic, as the picker works small areas of the rawhide come in pressure contact with the moving parts, such as the spindle rod and the picker stick, and permit the sealed-in lubricant to extrude to the engaging surfaces. It has also been found that the oil locked in the rawhide fibres lubricates the fibres and keeps the rawhide pliable and resilient, so that the tensile strength of the rawhide is greatly increased to a figure substantially double the tensile strength of ordinary rawhide. Further, the rawhide cannot become dry or brittle, and the effective life of the picker is thus greatly increased.

Special one-piece molded articles, such as picker sticks, may be advantageously made by molding laminations of other animal fibre materials, such as leather, or vegetable fibre materials, such as textiles, with thermo-plastic intermediate sheets, and with or without an outer sheath of thermo-plastic material, under uniform heat conditions and pressure as above described.

Although the invention has been described specifically with respect to the manufacture of a rawhide picker, the invention may be applied to any machine element made from laminated rawhide, such as for example laminated gears, gear blanks, mallets, hammers, impact tools, drawing guides and stringing guides for wire and cord, sheaves and pulleys, temple rolls for loom parts, shuttles, and for the manufacture of rods, sheets and tubes from which laminated machine elements of any type, size and shape may be broached or cut, without departing from the spirit and the scope of the invention as defined in the appended claims.

I claim:

1. A one-piece molded article comprising layers of alkalized rawhide, said rawhide being impregnated with lubricating oil and thermoplastic material, said layers being bonded together by intermediate layers of thermo-plastic material and having an outer sheath of thermo-plastic material.

2. A one-piece picker comprising a central alkalized rawhide lamination, additional alkalized rawhide laminations folded over each end of the central lamination, said rawhide laminations being oil impregnated and bonded together by intermediate thermo-plastic material laminations, said laminations having an outer sheath of thermo-plastic material.

JOSEPH H. CHADBOURNE.

REFERENCES CITED

The following references are of record in the file of this patent:

UNITED STATES PATENTS

| Number | Name | Date |
| --- | --- | --- |
| 203,139 | Gordon | Apr. 30, 1878 |
| 781,350 | Moser | Jan. 31, 1905 |
| 907,961 | Bowes | Dec. 29, 1908 |
| 1,044,891 | Kornder | Nov. 19, 1912 |
| 1,618,031 | Widmer | Feb. 15, 1927 |
| 1,787,182 | Weiss | Dec. 30, 1930 |
| 1,801,064 | Wynne | Apr. 14, 1931 |
| 1,835,619 | Walsh | Dec. 8, 1931 |
| 1,958,220 | Webb | May 8, 1934 |
| 2,032,734 | Bacon | Mar. 3, 1936 |
| 2,182,045 | Bell | Dec. 5, 1939 |
| 2,191,367 | Carothers | Feb. 20, 1940 |
| 2,214,405 | Coffman | Sept. 10, 1940 |
| 2,217,961 | McGill | Oct. 15, 1940 |
| 2,219,447 | Groff | Oct. 29, 1940 |
| 2,245,140 | Brahs | June 10, 1941 |
| 2,308,393 | Shivell | Jan. 12, 1943 |
| 2,353,454 | Gillet et al. | July 11, 1944 |
| 2,396,715 | McGrew | Mar. 19, 1946 |
| 2,407,833 | Jablonsky | Sept. 17, 1946 |

FOREIGN PATENTS

| Number | Country | Date |
| --- | --- | --- |
| 863 | Great Britain | of 1870 |
| 2,210 | Great Britain | of 1870 |
| 289,218 | Great Britain | Apr. 26, 1928 |
| 314,679 | Great Britain | July 4, 1929 |
| 352,361 | Great Britain | Nov. 10, 1930 |
| 352,522 | Great Britain | Mar. 12, 1930 |
| 456,726 | Great Britain | Nov. 9, 1936 |
| 217,199 | Switzerland | Feb. 2, 1942 |

OTHER REFERENCES

Synthetic Organic Chemical, Carbide and Carbon Chemical Corp., 10th Ed. (1940), pages 34–35. (Copy in Div. 50.)